(12) United States Patent
Atsushi et al.

(10) Patent No.: US 11,554,764 B2
(45) Date of Patent: Jan. 17, 2023

(54) HYDRAULIC PRESSURE CONTROL UNIT FOR STRADDLE-TYPE VEHICLE BRAKE SYSTEM AND STRADDLE-TYPE VEHICLE BRAKE SYSTEM

(71) Applicant: Robert Bosch GmbH, Stuttgart (DE)

(72) Inventors: Hiroaki Atsushi, Kanagawa (JP); Kosaku Sagayama, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 295 days.

(21) Appl. No.: 16/958,330

(22) PCT Filed: Dec. 14, 2018

(86) PCT No.: PCT/IB2018/060086
§ 371 (c)(1),
(2) Date: Jun. 26, 2020

(87) PCT Pub. No.: WO2019/130148
PCT Pub. Date: Jul. 4, 2019

(65) Prior Publication Data
US 2021/0053539 A1 Feb. 25, 2021

(30) Foreign Application Priority Data
Dec. 26, 2017 (JP) .............................. JP2017-248599

(51) Int. Cl.
*B60T 8/36* (2006.01)
*B60T 13/14* (2006.01)
(Continued)

(52) U.S. Cl.
CPC .......... *B60T 13/142* (2013.01); *B60T 8/3225* (2013.01); *B60T 8/368* (2013.01); *B60T 13/148* (2013.01); *B60T 13/686* (2013.01)

(58) Field of Classification Search
CPC ...... B60T 8/368; B60T 8/3675; B60T 8/3225; B60T 8/4031; B60T 13/142
See application file for complete search history.

(56) References Cited

U.S. PATENT DOCUMENTS

2009/0072616 A1* 3/2009 Weh ...................... B60T 8/4872
303/113.2
2013/0319562 A1* 12/2013 Weh .................... F15B 13/0803
137/884
(Continued)

FOREIGN PATENT DOCUMENTS

CN 101062684 A 10/2007
CN 101195374 A 6/2008
(Continued)

OTHER PUBLICATIONS

International Search Report for Application No. PCT/IB2018/060086 dated Mar. 4, 2019 (English Translation, 3 pages).

*Primary Examiner* — Bradley T King
(74) *Attorney, Agent, or Firm* — Michael Best & Friedrich LLP (57) ABSTRACT

To obtain a hydraulic pressure control unit and a straddle-type vehicle brake system, each of which can answer a request for downsizing.
The straddle-type vehicle brake system has a hydraulic circuit that includes: a primary channel through which brake fluid in a master cylinder is delivered to a wheel cylinder; a secondary channel through which the brake fluid in the wheel cylinder is released to a primary channel intermediate portion; and a supply channel that supplies the brake fluid to a secondary channel intermediate portion. In a state where a surface on which a motor 28 of a base body 51 in the hydraulic pressure control unit is vertically provided is seen from the front, an opening for a first valve 31 that controls a flow rate on the wheel cylinder side of the primary channel intermediate portion and an opening for a second valve 32 that controls a flow rate on an upstream side of the secondary
(Continued)

channel intermediate portion overlap a first straight line L1, and an opening for a third valve 35 that controls a flow rate on the master cylinder side of the primary channel intermediate portion and an opening for a fourth valve 36 that controls a flow rate of the supply channel overlap a second straight line L2 that crosses the first straight line L1 at a right angle.

11 Claims, 8 Drawing Sheets

(51) Int. Cl.
*B60T 13/68* (2006.01)
*B60T 8/32* (2006.01)

(56) References Cited

U.S. PATENT DOCUMENTS

| | | | | |
|---|---|---|---|---|
| 2015/0321650 | A1* | 11/2015 | Schlitzkus | B60T 8/4872 137/78.1 |
| 2017/0072925 | A1* | 3/2017 | Mayr | B60T 8/368 |
| 2017/0080910 | A1* | 3/2017 | Sagayama | B60T 8/368 |
| 2020/0130665 | A1* | 4/2020 | Reuter | B60T 13/686 |
| 2021/0114571 | A1* | 4/2021 | Sagayama | B60T 17/02 |
| 2021/0237704 | A1* | 8/2021 | Sagayama | B60T 7/042 |
| 2021/0309197 | A1* | 10/2021 | Weh | B60T 8/343 |

FOREIGN PATENT DOCUMENTS

| | | |
|---|---|---|
| CN | 101264758 A | 9/2008 |
| CN | 102414064 A | 4/2012 |
| CN | 103303282 A | 9/2013 |
| DE | 9415078 | 2/1995 |
| DE | 102007031750 | 2/2008 |
| JP | 2007168456 | 7/2007 |
| JP | 2014024470 | 2/2014 |
| WO | 2006058859 | 6/2006 |
| WO | 2009051008 | 4/2009 |
| WO | 2014111352 | 7/2014 |

* cited by examiner

HYDRAULIC PRESSURE CONTROL UNIT FOR STRADDLE-TYPE VEHICLE BRAKE SYSTEM AND STRADDLE-TYPE VEHICLE BRAKE SYSTEM

BACKGROUND OF THE INVENTION

The present invention relates to a hydraulic pressure control unit in a straddle-type vehicle brake system and to a straddle-type vehicle brake system that includes the hydraulic pressure control unit.

As a conventional straddle-type vehicle brake system that has been available, the straddle-type vehicle brake system has a hydraulic circuit including: a primary channel through which brake fluid in a master cylinder is delivered to a wheel cylinder; a secondary channel which is provided with a pump and through which the brake fluid in the wheel cylinder is released to an intermediate portion of the primary channel by driving the pump; and a supply channel through which the brake fluid is supplied to a region on a suction side of the pump in the secondary channel (for example, see PTL 1).

CITATION LIST

Patent Literature

PTL 1: WO 2009/051008

The straddle-type vehicle brake system includes a hydraulic pressure control unit that controls a hydraulic pressure of a wheel cylinder. The hydraulic pressure control unit includes: a base body in which an internal channel constituting a part of the hydraulic circuit is formed; a first valve (EV) that controls a flow rate on the wheel cylinder side of a portion of the primary channel, a downstream end of the secondary channel being connected to the portion; a second valve (AV) that controls a flow rate on an upstream side of a portion of the secondary channel, a downstream end of the supply channel being connected to the portion; a third valve (USV) that controls a flow rate on the master cylinder side of the portion of the primary channel, the downstream end of the secondary channel being connected to the portion; a fourth valve (HSV) that controls a flow rate of the supply channel; the pump that is provided on a downstream side of the portion of the secondary channel, the downstream end of the supply channel being connected to the portion; and a motor as a drive source of the pump. In such a hydraulic pressure control unit, when the motor is driven in a state where the third valve is closed and the fourth valve is opened, for example, the hydraulic pressure of the brake fluid in the wheel cylinder can be boosted automatically without relying on a rider's operation.

Here, the straddle-type vehicle has a lower degree of freedom in component layout than other vehicles. In recent years, a request for downsizing of the above-described hydraulic pressure control unit has been increasing. In other words, there is such a problem that it is necessary to consider downsizing of the hydraulic pressure control unit capable of automatically boosting the pressure as an additional function.

SUMMARY OF THE INVENTION

The present invention has been made with the above-described problem as the background and therefore has a purpose of obtaining a hydraulic pressure control unit capable of answering a request for downsizing. The present invention also has a purpose of obtaining a straddle-type vehicle brake system that includes such a hydraulic pressure control unit.

Solution to Problem

A hydraulic pressure control unit according to the present invention is a hydraulic pressure control unit that is used for a straddle-type vehicle brake system having a hydraulic circuit that at least includes: a primary channel through which brake fluid in a master cylinder is delivered to a wheel cylinder; a secondary channel which is provided with a pump and through which the brake fluid in the wheel cylinder is released to a primary channel intermediate portion as an intermediate portion of the primary channel by driving the pump; and a supply channel that supplies the brake fluid to a secondary channel intermediate portion as a region on a suction side of the pump in the secondary channel, and controls a hydraulic pressure of the brake fluid in the wheel cylinder. The hydraulic pressure control unit includes: a base body that is formed with an internal channel constituting a part of the hydraulic circuit; a first valve that is attached to a first valve hole and controls a flow rate in a region on the wheel cylinder side of the primary channel intermediate portion in the primary channel of the hydraulic circuit, the first valve hole extending from a first valve opening that is formed on an outer surface of the base body to the internal channel; a second valve that is attached to a second valve hole and controls a flow rate in a region on an upstream side of the secondary channel intermediate portion in the secondary channel of the hydraulic circuit, the second valve hole extending from a second valve opening that is formed on the outer surface of the base body to the internal channel; a third valve that is attached to a third valve hole and controls a flow rate in a region on the master cylinder side of the primary channel intermediate portion in the primary channel of the hydraulic circuit, the third valve hole extending from a third valve opening that is formed on the outer surface of the base body to the internal channel; a fourth valve that is attached to a fourth valve hole and controls a flow rate in the supply channel of the hydraulic circuit, the fourth valve hole extending from a fourth valve opening that is formed on the outer surface of the base body to the internal channel; and a motor that is a drive source of the pump in the hydraulic circuit and is vertically provided in the base body. In a state where a surface on which the motor of the base body is vertically provided is seen from the front, the first valve opening and the second valve opening overlap a first straight line that passes an outer side of the motor, and the third valve opening and the fourth valve opening overlap a second straight line that passes the outer side of the motor and crosses the first straight line at a right angle.

A straddle-type vehicle brake system according to the present invention includes the above-described hydraulic pressure control unit.

Advantageous Effects of Invention

In the hydraulic pressure control unit and the straddle-type vehicle brake system according to the present invention, in the state where the surface on which the motor of the base body is vertically provided is seen from the front, the first valve opening of the base body and the second valve opening of the base body overlap the first straight line that passes the outer side of the motor, the third valve opening of the base body and the fourth valve opening of the base body overlap the second straight line that passes the outer side of the motor and crosses the first straight line at the right angle. The first valve (EV) is inserted in the first valve opening, the second valve (AV) is inserted in the second valve opening, the third valve (USV) is inserted in the third valve opening, and the fourth valve (HSV) is inserted in the fourth valve opening. That is, in the hydraulic pressure control unit and the straddle-type vehicle brake system according to the present invention, the first valve, the second valve, the third valve, and the fourth valve can be provided near the motor by adopting the above-described arrangement. Thus, the base body can be downsized. In addition, the first valve and the second valve can be arranged near each other, and the third valve and the fourth valve can be arranged near each other by adopting the above-described arrangement. Thus, the base body can be downsized while the internal channel of the base body is inhibited from becoming complicated.

DETAILED DESCRIPTION

A description will hereinafter be made on a hydraulic pressure control unit according to the present invention by using the drawings.

Note that the following description will be made on a case where a straddle-type vehicle brake system that includes the hydraulic pressure control unit according to the present invention is mounted on a two-wheeled motor vehicle; however, the straddle-type vehicle brake system that includes the hydraulic pressure control unit according to the present invention may be mounted on a straddle-type vehicle other than the two-wheeled motor vehicle (a three-wheeled motor vehicle or the like). In addition, the following description will be made on a case where the straddle-type vehicle brake system that includes the hydraulic pressure control unit according to the present invention includes two systems of hydraulic circuits; however, the straddle-type vehicle brake system that includes the hydraulic pressure control unit according to the present invention may only include one-system of the hydraulic circuit or may include three or more systems of the hydraulic circuits.

A configuration, an operation, and the like, which will be described below, constitute merely one example, and the straddle-type vehicle brake system that includes the hydraulic pressure control unit according to the present invention is not limited to a case with such a configuration, such an operation, and the like. There is a case where similar members or portions are denoted by the same reference sign in each of the drawings. In addition, there is a case where the similar members or portions are not denoted by the reference sign in each of the drawings. A detailed structure is appropriately depicted in a simplified manner or is not depicted.

Embodiment

A description will hereinafter be made on a straddle-type vehicle brake system according to an embodiment.

<Configuration and Operation of Straddle-Type Vehicle Brake System>

A description will be made on a configuration and an operation of the straddle-type vehicle brake system according to the embodiment.

Figure 1:
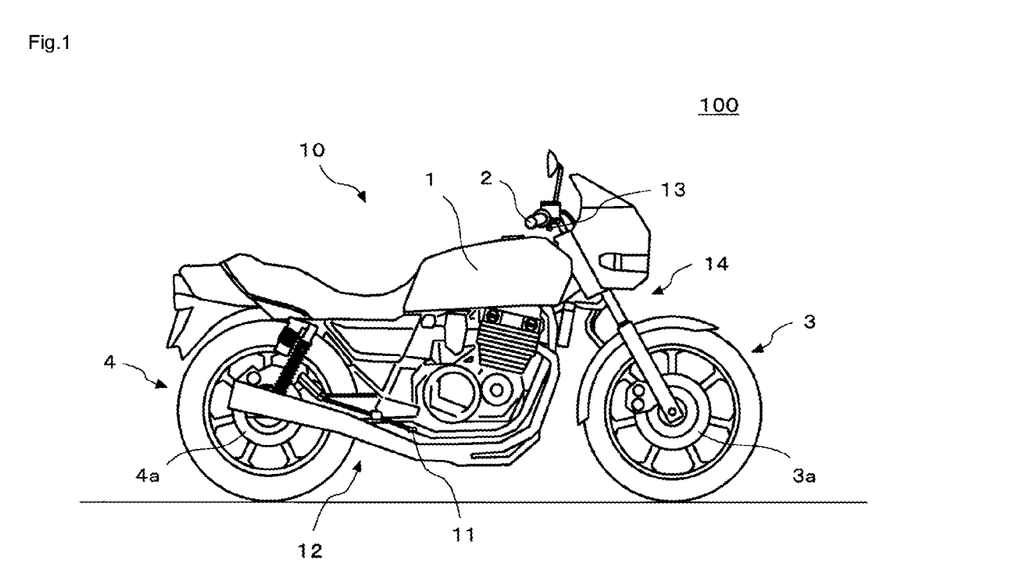
FIG. 1 is a configuration diagram of a straddle-type vehicle on which a straddle-type vehicle brake system according to an embodiment of the present invention is mounted.
Figure 2:
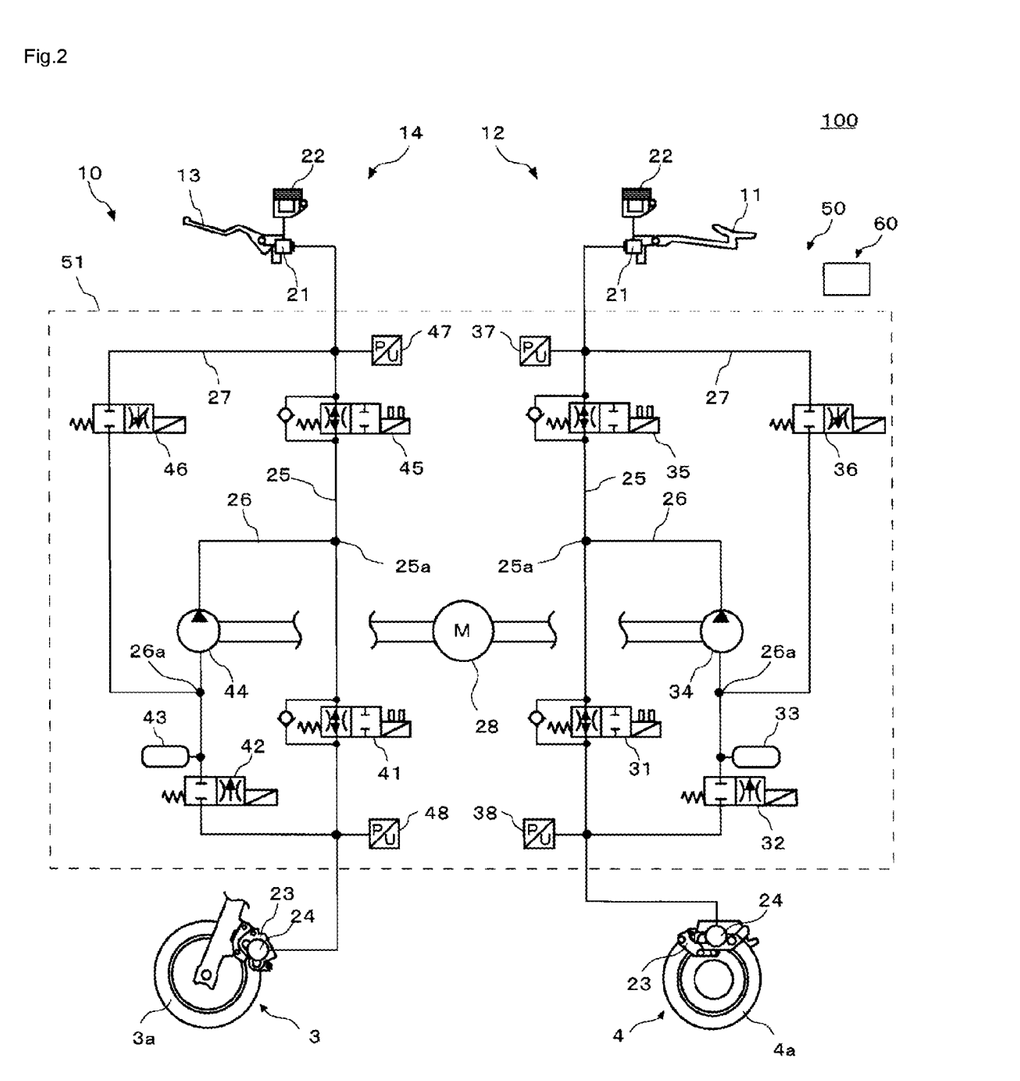
FIG. 2 is a configuration diagram of the straddle-type vehicle brake system according to the embodiment of the present invention.

FIG. 1 is a configuration diagram of a straddle-type vehicle on which the straddle-type vehicle brake system according to the embodiment of the present invention is mounted. FIG. 2 is a configuration diagram of the straddle-type vehicle brake system according to the embodiment of the present invention.

As depicted in FIG. 1 and FIG. 2, a straddle-type vehicle brake system 10 is mounted on a straddle-type vehicle 100. The straddle-type vehicle 100 includes: a trunk 1; a handlebar 2 that is held by the trunk 1 in a freely turnable manner; a front wheel 3 that is held by the trunk 1 in a freely turnable manner with the handlebar 2; and a rear wheel 4 that is held by the trunk 1 in a freely rotatable manner.

The straddle-type vehicle brake system 10 includes: a first brake operation section 11; a rear-wheel hydraulic circuit 12 that is filled with brake fluid; a second brake operation section 13; and a front-wheel hydraulic circuit 14 that is filled with the brake fluid. The rear-wheel hydraulic circuit 12 causes a rotor 4a that rotates with the rear wheel 4 to generate a braking force corresponding to an operation amount of the first brake operation section 11. The front-wheel hydraulic circuit 14 causes a rotor 3a that rotates with the front wheel 3 to generate the braking force corresponding to an operation amount of the second brake operation section 13. The rear-wheel hydraulic circuit 12 corresponds to one of the "first hydraulic circuit" and the "second hydraulic circuit" in the present invention. The front-wheel hydraulic circuit 14 corresponds to the other of the "first hydraulic circuit" and the "second hydraulic circuit" in the present invention.

The first brake operation section 11 is provided in a lower portion of the trunk 1 and is operated by a user's foot. The first brake operation section 11 is a brake pedal, for example. The second brake operation section 13 is provided on the handlebar 2 and is operated by a user's hand. The second brake operation section 13 is a brake lever, for example.

Each of the rear-wheel hydraulic circuit 12 and the front-wheel hydraulic circuit 14 includes: a master cylinder 21 that includes a piston (not depicted) therein; a reservoir 22 that is attached to the master cylinder 21; a brake caliper 23 that is held by the trunk 1 and has a brake pad (not depicted); a wheel cylinder 24 that operates the brake pad (not depicted) of the brake caliper 23.

In addition, each of the rear-wheel hydraulic circuit 12 and the front-wheel hydraulic circuit 14 includes: a primary channel 25 through which the brake fluid in the master cylinder 21 is delivered to the wheel cylinder 24; a secondary channel 26 through which the brake fluid in the wheel cylinder 24 is released to a primary channel intermediate portion 25a as an intermediate portion of the primary channel 25; and a supply channel 27 through which the brake fluid in the master cylinder 21 is supplied to a secondary channel intermediate portion 26a as an intermediate portion of the secondary channel 26.

A description on the rear-wheel hydraulic circuit 12 will be supplemented. In a region on the wheel cylinder 24 side of the primary channel intermediate portion 25a in the primary channel 25, a first valve (EV) 31 is provided, and a flow rate of the brake fluid that flows through the region is controlled by an opening/closing operation of the first valve 31. In a region on an upstream side of the secondary channel intermediate portion 26a in the secondary channel 26, a second valve (AV) 32 and an accumulator 33 are sequentially provided from the upstream side, and a flow rate of the brake fluid that flows through the region is controlled by an opening/closing operation of the second valve 32. In a region on a downstream side of the secondary channel intermediate portion 26a in the secondary channel 26, a pump 34 is provided. In a region on the master cylinder 21 side of the primary channel intermediate portion 25a in the primary channel 25, a third valve (USV) 35 is provided, and a flow rate of the brake fluid that flows through the region is controlled by an opening/closing operation of the third valve 35. In the supply channel 27, a fourth valve (HSV) 36 is provided, and a flow rate of the brake fluid that flows through the supply channel 27 is controlled by an opening/closing operation of the fourth valve 36. In the region on the master cylinder 21 side of the third valve 35 in the primary channel 25, a master cylinder hydraulic pressure sensor 37 is provided to detect a hydraulic pressure of the brake fluid in the master cylinder 21. In a region on the wheel cylinder 24 side of the first valve 31 in the primary channel 25, a wheel cylinder hydraulic pressure sensor 38 is provided to detect a hydraulic pressure of the brake fluid in the wheel cylinder 24.

A description on the front-wheel hydraulic circuit 14 will be supplemented. In a region on the wheel cylinder 24 side of the primary channel intermediate portion 25a in the primary channel 25, a fifth valve (EV) 41 is provided, and a flow rate of the brake fluid that flows through the region is controlled by an opening/closing operation of the fifth valve 41. In a region on an upstream side of the secondary channel intermediate portion 26a in the secondary channel 26, a sixth valve (AV) 42 and an accumulator 43 which stores the brake fluid are sequentially provided from the upstream side, and a flow rate of the brake fluid that flows through the region is controlled by an opening/closing operation of the sixth valve 42. In a region on a downstream side of the secondary channel intermediate portion 26a in the secondary channel 26, a pump 44 is provided. In a region on the master cylinder 21 side of the primary channel intermediate portion 25a in the primary channel 25, a seventh valve (USV) 45 is provided, and a flow rate of the brake fluid that flows through the region is controlled by an opening/closing operation of the seventh valve 45. In the supply channel 27, an eighth valve (HSV) 46 is provided, and a flow rate of the brake fluid that flows through the supply channel 27 is controlled by an opening/closing operation of the eighth valve 46. In a region on the master cylinder 21 side of the seventh valve 45 in the primary channel 25, a master cylinder hydraulic pressure sensor 47 is provided to detect a hydraulic pressure of the brake fluid in the master cylinder 21. In a region on the wheel cylinder 24 side of the fifth valve 41 in the primary channel 25, a wheel cylinder hydraulic pressure sensor 48 is provided to detect a hydraulic pressure of the brake fluid in the wheel cylinder 24.

Each of the first valve 31 and the fifth valve 41 is an electromagnetic valve that is opened in an unenergized state and closed in an energized state, for example. Each of the second valve 32 and the sixth valve 42 is an electromagnetic valve that is closed in an unenergized state and opened in an energized state, for example. Each of the third valve 35 and the seventh valve 45 is the electromagnetic valve that is opened in the unenergized state and closed in the energized state, for example. Each of the fourth valve 36 and the eighth valve 46 is the electromagnetic valve that is closed in the unenergized state and opened in the energized state, for example. The pump 34 in the rear-wheel hydraulic circuit 12 and the pump 44 in the front-wheel hydraulic circuit 14 are driven by a common motor 28.

A hydraulic pressure control unit 50 is configured by including: members such as the first valve 31, the second valve 32, the accumulator 33, the pump 34, the third valve 35, the fourth valve 36, the master cylinder hydraulic pressure sensor 37, the wheel cylinder hydraulic pressure sensor 38, the fifth valve 41, the sixth valve 42, the accumulator 43, the pump 44, the seventh valve 45, the eighth valve 46, the master cylinder hydraulic pressure sensor 47, and the wheel cylinder hydraulic pressure sensor 48; a base body 51 that is provided with those members and is formed with a rear-wheel internal channel 51A and a front-wheel internal channel 51B, each of which constitutes the primary channel 25, the secondary channel 26, and the supply channel 27; and a controller (ECU) 60. In the straddle-type vehicle brake system 10, the hydraulic pressure control unit 50 is a unit that has a function of controlling the hydraulic pressure of the brake fluid in each of the wheel cylinders 24, that is, a braking force on the rear wheel 4 that is generated by the rear-wheel hydraulic circuit 12 and a braking force on the front wheel 3 that is generated by the front-wheel hydraulic circuit 14. The rear-wheel internal channel 51A corresponds to one of the "first internal channel" and the "second internal channel" in the present invention. The front-wheel internal channel 51B corresponds to the other of the "first internal channel" and the "second internal channel" in the present invention.

The members may collectively be provided in the single base body 51 or may separately be provided in the multiple base bodies 51. In addition, the controller 60 may be provided as one unit or may be divided into multiple units. Furthermore, the controller 60 may be attached to the base body 51 or may be attached to the member other than the base body 51. Moreover, the controller 60 may partially or entirely be constructed of a microcomputer, a microprocessor unit, or the like, may be constructed of a member in which firmware or the like can be updated, or may be a program module or the like that is executed by a command from a CPU or the like, for example.

In a normal state, the controller 60 opens the first valve 31 and the fifth valve 41, closes the second valve 32 and the sixth valve 42, opens the third valve 35 and the seventh valve 45, and closes the fourth valve 36 and the eighth valve 46. When the first brake operation section 11 is operated in this state, in the rear-wheel hydraulic circuit 12, the piston (not depicted) in the master cylinder 21 is pressed to increase the hydraulic pressure of the brake fluid in the wheel cylinder 24, the brake pad (not depicted) of the brake caliper 23 is pressed against the rotor 4a of the rear wheel 4, and the rear wheel 4 is thereby braked. When the second brake operation section 13 is operated, in front-wheel hydraulic circuit 14, the piston (not depicted) in the master cylinder 21 is pressed to increase the hydraulic pressure of the brake fluid in the wheel cylinder 24, the brake pad (not depicted) of the brake caliper 23 is pressed against the rotor 3a of the front wheel 3, and the front wheel 3 is thereby braked.

The controller 60 receives output of each of the sensors (the master cylinder hydraulic pressure sensor 37, the wheel cylinder hydraulic pressure sensor 38, the master cylinder hydraulic pressure sensor 47, the wheel cylinder hydraulic pressure sensor 48, a wheel speed sensor, an acceleration sensor, and the like). Corresponding to those output, the controller 60 outputs a command that governs operations of the motor 28, the first valve 31, the second valve 32, the third valve 35, the fourth valve 36, the fifth valve 41, the sixth valve 42, the seventh valve 45, the eighth valve 46, and the like, so as to perform a pressure reducing control operation or a pressure boosting control operation.

For example, in the case where the hydraulic pressure of the brake fluid in the wheel cylinder 24 is excessive or possibly excessive in the rear-wheel hydraulic circuit 12, the controller 60 performs an operation to reduce the hydraulic pressure of the brake fluid in the wheel cylinder 24 in the rear-wheel hydraulic circuit 12. At the time, the controller 60 drives the pump 34 in a state where the first valve 31 is closed, the second valve 32 is opened, the third valve 35 is opened, and the fourth valve 36 is closed in the rear-wheel hydraulic circuit 12. In addition, in the case where the hydraulic pressure of the brake fluid in the wheel cylinder 24 is excessive or possibly excessive in the front-wheel hydraulic circuit 14, the controller 60 performs an operation to reduce the hydraulic pressure of the brake fluid in the wheel cylinder 24 in the front-wheel hydraulic circuit 14. At the time, the controller 60 drives the pump 44 in a state where the fifth valve 41 is closed, the sixth valve 42 is opened, the seventh valve 45 is opened, and the eighth valve 46 is closed in the front-wheel hydraulic circuit 14.

For example, in the case where the hydraulic pressure of the brake fluid in the wheel cylinder 24 is short or possibly short in the rear-wheel hydraulic circuit 12, the controller 60 performs an operation to boost the hydraulic pressure of the brake fluid in the wheel cylinder 24 in the rear-wheel hydraulic circuit 12. At the time, the controller 60 drives the pump 34 in a state where the first valve 31 is opened, the second valve 32 is closed, the third valve 35 is closed, and the fourth valve 36 is opened in the rear-wheel hydraulic circuit 12. In the case where the hydraulic pressure of the brake fluid in the wheel cylinder 24 is short or possibly short in the front-wheel hydraulic circuit 14, the controller 60 performs an operation to boost the hydraulic pressure of the brake fluid in the wheel cylinder 24 in the front-wheel hydraulic circuit 14. At the time, the controller 60 drives the pump 44 in a state where the fifth valve 41 is opened, the sixth valve 42 is closed, the seventh valve 45 is closed, and the eighth valve 46 is opened in the front-wheel hydraulic circuit 14.

<Configuration of Hydraulic Pressure Control Unit>

A description will be made on a configuration of the hydraulic pressure control unit in the straddle-type vehicle brake system according to the embodiment.

Figure 3:
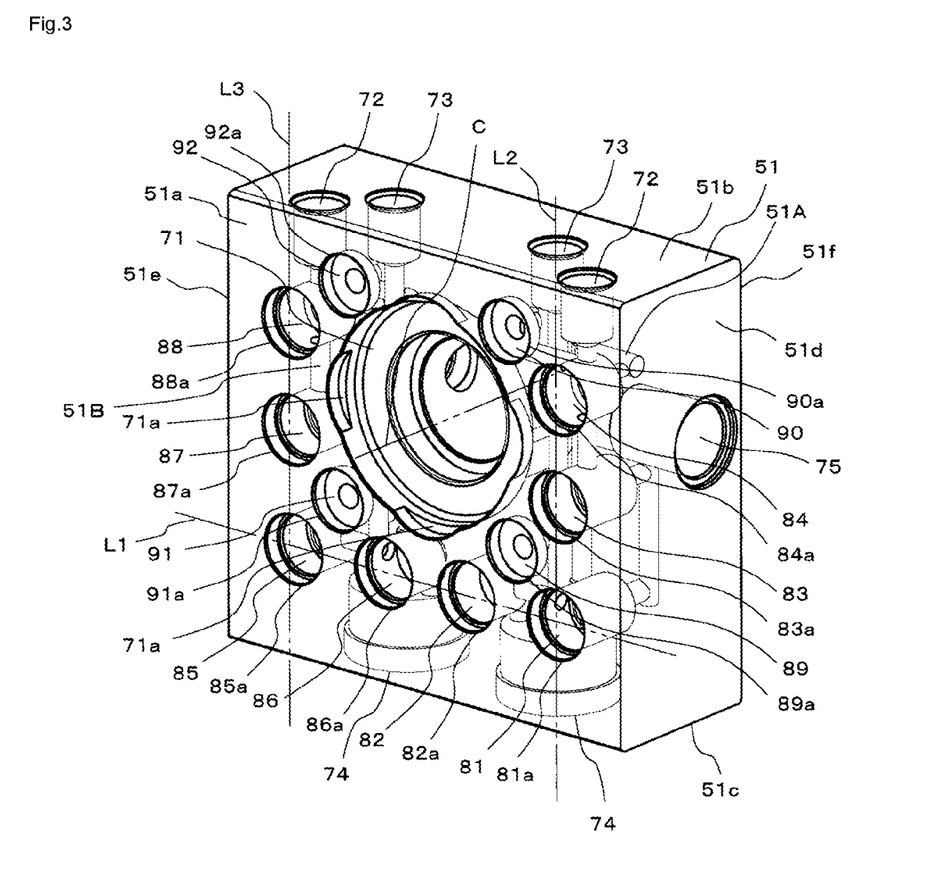
FIG. 3 is a perspective view of a base body of a hydraulic pressure control unit in the straddle-type vehicle brake system according to the embodiment of the present invention.
Figure 4:
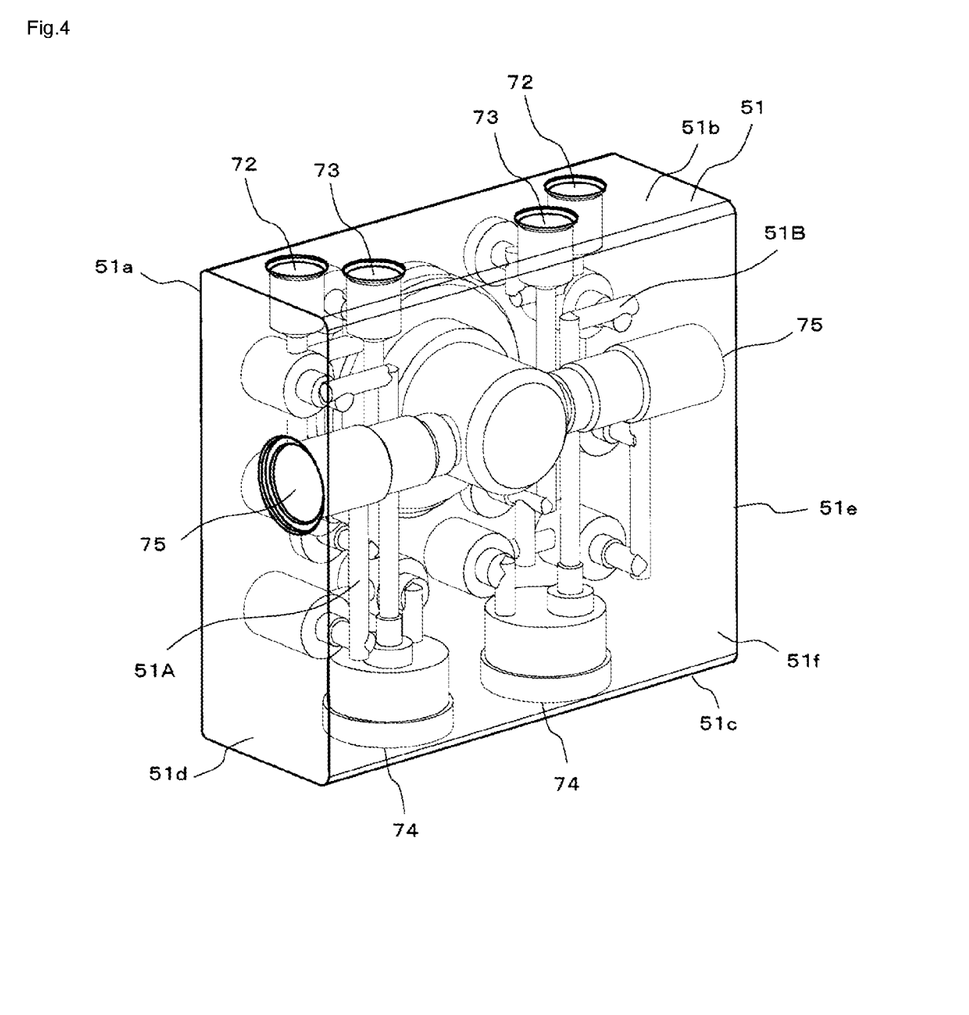
FIG. 4 is another perspective view of the base body of the hydraulic pressure control unit in the straddle-type vehicle brake system according to the embodiment of the present invention.
Figure 5:
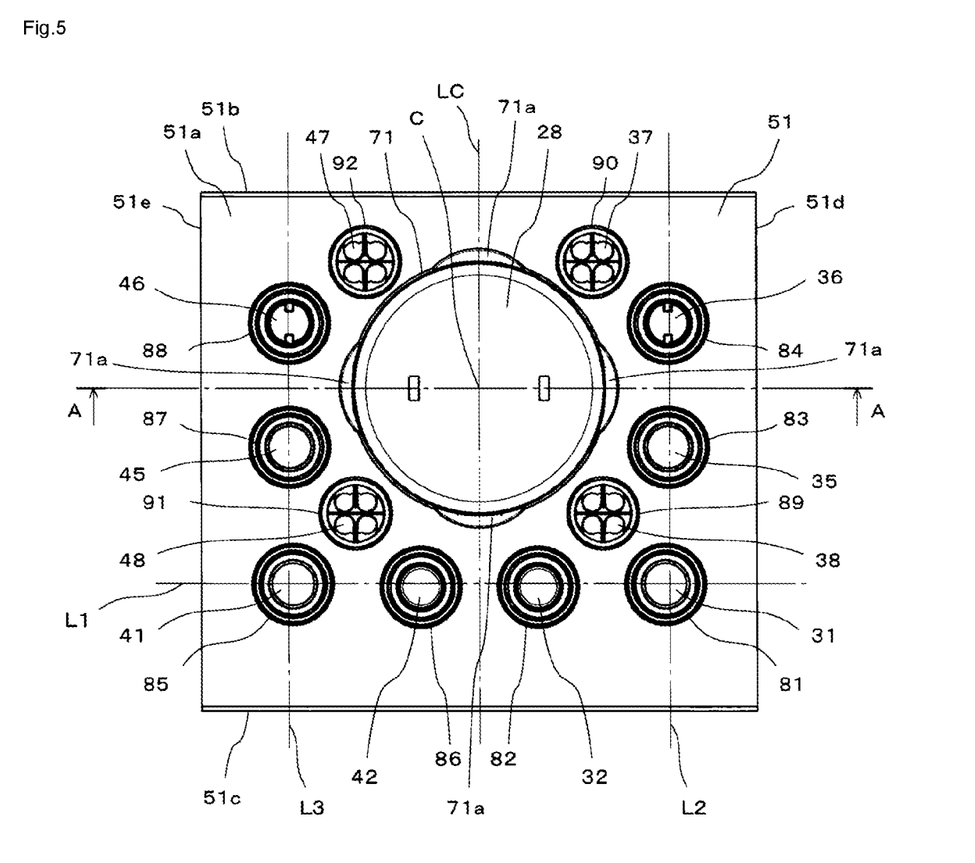
FIG. 5 is a plan view of a state where each member is attached to the base body of the hydraulic pressure control unit in the straddle-type vehicle brake system according to the embodiment of the present invention.
Figure 6:
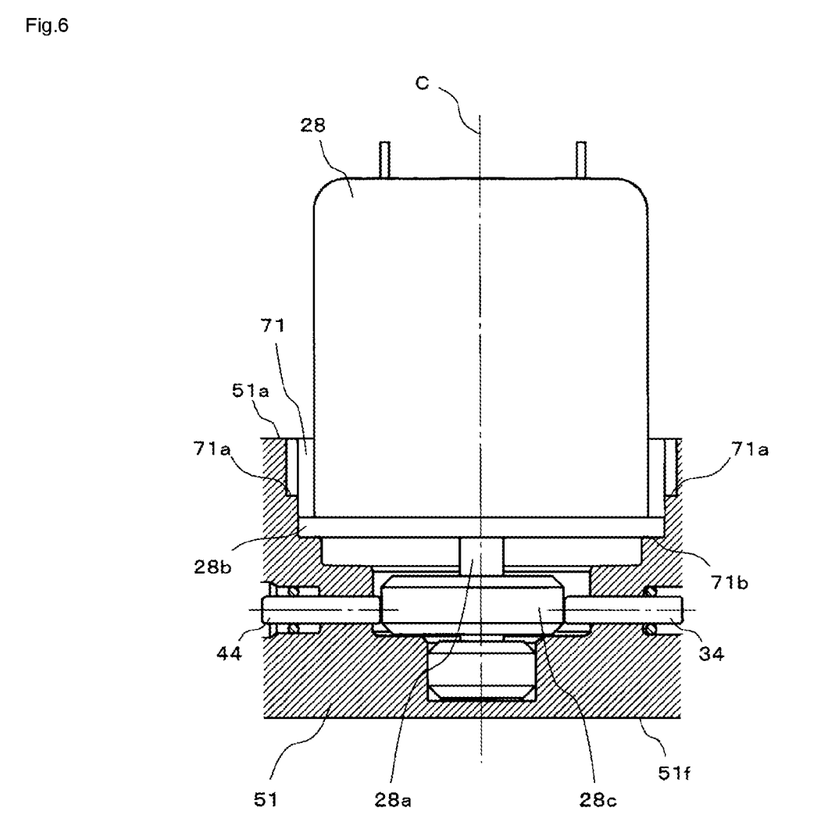
FIG. 6 is a partial cross-sectional view that is taken along line A-A in FIG. 5.

FIG. 3 and FIG. 4 are perspective views of the base body of the hydraulic pressure control unit in the straddle-type vehicle brake system according to the embodiment of the present invention. FIG. 5 is a plan view of a state where each of the members is attached to the base body of the hydraulic pressure control unit in the straddle-type vehicle brake system according to the embodiment of the present invention. FIG. 6 is a partial cross-sectional view that is taken along line A-A in FIG. 5.

As depicted in FIG. 3 and FIG. 4, the base body 51 has a substantially rectangular-parallelepiped shape. A primary surface 51a of the base body 51 is formed with a bottomed motor hole 71, and the motor 28 is inserted in the motor hole 71 and is vertically provided. A first side surface 51b as a side surface of the primary surface 51a of the base body 51 is formed with: master cylinder ports 72 to each of which a brake fluid pipe connected to the master cylinder 21 is connected; and wheel cylinder ports 73 to each of which a brake fluid pipe connected to the wheel cylinder 24 is connected. A second side surface 51c as a surface that opposes the first side surface 51b of the base body 51 is formed with accumulator holes 74, and the accumulators 33, 43 are embedded in the accumulator holes 74. A third side surface 51d and a fourth side surface 51e as the other side surfaces of the primary surface 51a of the base body 51 are each formed with a pump hole 75 which reaches the motor hole 71, and the pumps 34, 44 are embedded in the pump holes 75. The primary surface 51a corresponds to the "surface" in the present invention. The second side surface 51c corresponds to the "intersecting surface" in the present invention.

As depicted in FIG. 3, a portion around the motor hole 71 in the primary surface 51a is formed with: a first valve hole 81 that extends from a first valve opening 81a formed on an outer surface of the base body 51 to the rear-wheel internal channel 51A of the base body 51; a second valve hole 82 that extends from a second valve opening 82a formed on the outer surface of the base body 51 to the rear-wheel internal channel 51A of the base body 51; a third valve hole 83 that extends from a third valve opening 83a formed on the outer surface of the base body 51 to the rear-wheel internal channel 51A of the base body 51; a fourth valve hole 84 that extends from a fourth valve opening 84a formed on the outer surface of the base body 51 to the rear-wheel internal channel 51A of the base body 51; a fifth valve hole 85 that extends from a fifth valve opening 85a formed on the outer surface of the base body 51 to the front-wheel internal channel 51B of the base body 51; a sixth valve hole 86 that extends from a sixth valve opening 86a formed on the outer surface of the base body 51 to the front-wheel internal channel 51B of the base body 51; a seventh valve hole 87 that extends from a seventh valve opening 87a formed on the outer surface of the base body 51 to the front-wheel internal channel 51B of the base body 51; and an eighth valve hole 88 that extends from an eighth valve opening 88a formed on the outer surface of the base body 51 to the front-wheel internal channel 51B of the base body 51.

As depicted in FIG. 3 and FIG. 5, in a state where the primary surface 51a is seen from the front, the first valve opening 81a, the second valve opening 82a, the fifth valve opening 85a, and the sixth valve opening 86a overlap a first straight line L1 that passes an outer side of the motor 28. Note that the first straight line L1 is located between the motor 28 and a portion of the primary surface 51a that intersects with the second side surface 51c. In the state where the primary surface 51a is seen from the front, the third valve opening 83a and the fourth valve opening 84a overlap a second straight line L2 that passes the outer side of the motor 28 and crosses the first straight line L1 at a right angle. In the state where the primary surface 51a is seen from the front, the seventh valve opening 87a and the eighth valve opening 88a overlap a third straight line L3 that passes the outer side of the motor 28 and a far side of a rotation axis C of the motor 28 with the second straight line L2 being a reference and that crosses the first straight line L1 at the right angle. Note that the term "overlap" is a concept that includes not only a case where a center of the opening is located on the straight line but also a case where the center of the opening is off the straight line.

As depicted in FIG. 5, the first valve 31 (the EV in the rear-wheel hydraulic circuit 12) is embedded in the first valve hole 81 in a manner to be able to open/close the rear-wheel internal channel 51A in the base body 51. The second valve 32 (the AV in the rear-wheel hydraulic circuit 12) is embedded in the second valve hole 82 in the manner to be able to open/close the rear-wheel internal channel 51A in the base body 51. The fifth valve 41 (the EV in the front-wheel hydraulic circuit 14) is embedded in the fifth valve hole 85 in a manner to be able to open/close the front-wheel internal channel 51B in the base body 51. The sixth valve 42 (the AV in the front-wheel hydraulic circuit 14) is embedded in the sixth valve hole 86 in the manner to be able to open/close the front-wheel internal channel 51B in the base body 51. That is, on the first straight line L1, the second valve 32 and the sixth valve 42 are located on a closer side to the rotation axis C of the motor 28 than the first valve 31 and the fifth valve 41.

The third valve 35 (the USV in the rear-wheel hydraulic circuit 12) is embedded in the third valve hole 83 in the manner to be able to open/close the rear-wheel internal channel 51A in the base body 51. The fourth valve 36 (the HSV in the rear-wheel hydraulic circuit 12) is embedded in the fourth valve hole 84 in the manner to be able to open/close the rear-wheel internal channel 51A in the base body 51. That is, on the second straight line L2, the third valve 35 is located on a side where a distance from the third valve 35 to the first straight line L1 is shorter than that to the rotation axis C of the motor 28. In addition, on the second straight line L2, the fourth valve 36 is located on a side where a distance from the fourth valve 36 to the first straight line L1 is longer than that to the rotation axis C of the motor 28.

The seventh valve 45 (the USV in the front-wheel hydraulic circuit 14) is embedded in the seventh valve hole 87 in the manner to be able to open/close the front-wheel internal channel 51B in the base body 51. The eighth valve 46 (the HSV in the front-wheel hydraulic circuit 14) is embedded in the eighth valve hole 88 in the manner to be able to open/close the front-wheel internal channel 51B in the base body 51. That is, on the third straight line L3, the seventh valve 45 is located on a side where a distance from the seventh valve 45 to the first straight line L1 is shorter than that to the rotation axis C of the motor 28. In addition, on the third straight line L3, the eighth valve 46 is located on a side where a distance from the eighth valve 46 to the first straight line L1 is longer than that to the rotation axis C of the motor 28.

As depicted in FIG. 3, the portion around the motor hole 71 in the primary surface 51a is further formed with: a first hydraulic pressure sensor hole 89 that extends from a first hydraulic pressure sensor opening 89a formed on the outer surface of the base body 51 to the rear-wheel internal channel 51A of the base body 51; a second hydraulic pressure sensor hole 90 that extends from a second hydraulic pressure sensor opening 90a formed on the outer surface of the base body 51 to the rear-wheel internal channel 51A of the base body 51; a third hydraulic pressure sensor hole 91 that extends from a third hydraulic pressure sensor opening 91a formed on the outer surface of the base body 51 to the front-wheel internal channel 51B of the base body 51; and a fourth hydraulic pressure sensor hole 92 that extends from a fourth hydraulic pressure sensor opening 92a formed on the outer surface of the base body 51 to the front-wheel internal channel 51B of the base body 51.

As depicted in FIG. 3 and FIG. 5, in the state where the primary surface 51a is seen from the front, the first hydraulic pressure sensor opening 89a is located between the motor 28 and a combination of the first straight line L1 and the second straight line L2. In the state where the primary surface 51a is seen from the front, the second hydraulic pressure sensor opening 90a is located on a far side of the third valve opening 83a and the fourth valve opening 84a with the first straight line L1 being a reference. In the state where the primary surface 51a is seen from the front, the third hydraulic pressure sensor opening 91a is located between the motor 28 and a combination of the first straight line L1 and the third straight line L3. In the state where the primary surface 51a is seen from the front, the fourth hydraulic pressure sensor opening 92a is located on a far side of the seventh valve opening 87a and the eighth valve opening 88a with the first straight line L1 being the reference.

As depicted in FIG. 5, the wheel cylinder hydraulic pressure sensor 38 in the rear-wheel hydraulic circuit 12 is embedded in the first hydraulic pressure sensor hole 89 in a manner to be able to detect the hydraulic pressure of the brake fluid in the rear-wheel internal channel 51A of the base body 51. The master cylinder hydraulic pressure sensor 37 in the rear-wheel hydraulic circuit 12 is embedded in the second hydraulic pressure sensor hole 90 in the manner to be able to detect the hydraulic pressure of the brake fluid in the rear-wheel internal channel 51A of the base body 51. The wheel cylinder hydraulic pressure sensor 48 in the front-wheel hydraulic circuit 14 is embedded in the third hydraulic pressure sensor hole 91 in a manner to be able to detect the hydraulic pressure of the brake fluid in the front-wheel internal channel 51B of the base body 51. The master cylinder hydraulic pressure sensor 47 in the front-wheel hydraulic circuit 14 is embedded in the fourth hydraulic pressure sensor hole 92 in the manner to be able to detect the hydraulic pressure of the brake fluid in the front-wheel internal channel 51B of the base body 51.

In other words, as depicted in FIG. 5, in the state where the primary surface 51a is seen from the front, the members that belong to the rear-wheel hydraulic circuit 12 (that is, the first valve 31, the second valve 32, the accumulator 33, the pump 34, the third valve 35, the fourth valve 36, the master cylinder hydraulic pressure sensor 37, the wheel cylinder hydraulic pressure sensor 38, and the like) are collectively provided on a side where the second straight line L2 is present with a reference straight line LC being a reference, and the reference straight line LC crosses the first straight line L1 at the right angle and passes the rotation axis C of the motor 28. In addition, in the state where the primary surface 51a is seen from the front, the members that belong to the front-wheel hydraulic circuit 14 (that is, the fifth valve 41, the sixth valve 42, the accumulator 43, the pump 44, the seventh valve 45, the eighth valve 46, the master cylinder hydraulic pressure sensor 47, the wheel cylinder hydraulic pressure sensor 48, and the like) are collectively provided on a side where the third straight line L3 is present with the reference straight line LC being the reference.

As depicted in FIG. 3 and FIG. 5, steps 71a are formed on an inner circumferential surface of the motor hole 71, and each of the steps 71a displaces the inner circumferential surface of the motor hole 71 in a direction away from an outer circumferential surface of the motor 28. The four steps 71a are arranged on the inner circumferential surface of the motor hole 71 at 90° pitch. In the state where the primary surface 51a is seen from the front, a center of one of the steps 71a is located between the rotation axis C of the motor 28 and a combination of the third valve opening 83a and the fourth valve opening 84a. In addition, in the state where the primary surface 51a is seen from the front, a center of the step 71a that is formed on an opposite side of the above step 71a with the rotation axis C of the motor 28 being interposed therebetween is located between the rotation axis C of the motor 28 and a combination of the seventh valve opening 87a and the eighth valve opening 88a.

As depicted in FIG. 6, the motor 28 is inserted in the motor hole 71 in a state where an output shaft 28a of the motor 28 is located on a back side of the motor hole 71. A flange 28b is formed on the outer circumferential surface of the motor 28, and a seat 71b is formed on the back side of the steps 71a of the motor hole 71. The motor 28 is inserted until the flange 28b abuts the seat 71b, and is thereby vertically provided. In such a state, a jig is inserted in a space on the primary surface 51a side of each of the steps 71a in the motor hole 71 and pressurizes and deforms each of the steps 71a. In this way, the flange 28b is fixed in the motor hole 71.

An eccentric body 28c that rotates about the rotation axis C of the motor 28 is attached to the output shaft 28a of the motor 28. When the eccentric body 28c rotates, a piston, which is pressed against an outer circumferential surface of the eccentric body 28c, in the pump 34 of the rear-wheel hydraulic circuit 12 and a piston, which is pressed against an outer circumferential surface of the eccentric body 28c, in the pump 44 of the front-wheel hydraulic circuit 14 reciprocate. In this way, the brake fluid is transferred from a suction side to a discharge side.

<Effects of Straddle-Type Vehicle Brake System>

A description will be made on effects of the straddle-type vehicle brake system according to the embodiment.

In the hydraulic pressure control unit 50, in the state where a surface (the primary surface 51a) on which the motor 28 of the base body 51 is vertically provided is seen from the front, the first valve opening 81a of the base body 51 and the second valve opening 82a of the base body 51 overlap the first straight line L1 that passes the outer side of the motor 28, the third valve opening 83a of the base body 51 and the fourth valve opening 84a of the base body 51 overlap the second straight line L2 that passes the outer side of the motor 28 and crosses the first straight line L1 at the right angle. The first valve 31 (the EV in the rear-wheel hydraulic circuit 12) is inserted in the first valve opening 81a, the second valve 32 (the AV in the rear-wheel hydraulic circuit 12) is inserted in the second valve opening 82a, the third valve 35 (the USV in the rear-wheel hydraulic circuit 12) is inserted in the third valve opening 83a, and the fourth valve 36 (the HSV in the rear-wheel hydraulic circuit 12) is inserted in the fourth valve opening 84a. That is, in the hydraulic pressure control unit 50, the first valve 31, the second valve 32, the third valve 35, and the fourth valve 36 can be provided near the motor 28. Thus, the base body 51 can be downsized. In addition, the first valve 31 and the second valve 32 can be arranged near each other, and the third valve 35 and the fourth valve 36 can be arranged near each other. Thus, the base body 51 can be downsized while the internal channels of the base body 51 are inhibited from becoming complicated.

Preferably, in the hydraulic pressure control unit 50, in the state where the surface (the primary surface 51a) on which the motor 28 of the base body 51 is vertically provided is seen from the front, the first hydraulic pressure sensor opening 89a, in which the wheel cylinder hydraulic pressure sensor 38 is inserted, is located between the motor 28 and the combination of the first straight line L1 and the second straight line L2. With such a configuration, in regard to the hydraulic circuit (the rear-wheel hydraulic circuit 12) that is provided with the wheel cylinder hydraulic pressure sensor 38, the base body 51 can be downsized.

Preferably, in the hydraulic pressure control unit 50, in the state where the surface (the primary surface 51a) on which the motor 28 of the base body 51 is vertically provided is seen from the front, the second hydraulic pressure sensor opening 90a, in which the master cylinder hydraulic pressure sensor 37 is inserted, is located on the far side of the third valve opening 83a and the fourth valve opening 84a with the first straight line L1 being the reference. With such a configuration, a space between the first side surface 51b and the combination of the third valve opening 83a and the fourth valve opening 84a can efficiently be used. Thus, the base body 51 can be downsized.

Preferably, in the hydraulic pressure control unit 50, in the state where the surface (the primary surface 51a) on which the motor 28 of the base body 51 is vertically provided is seen from the front, a distance from one of the third valve opening 83a and the fourth valve opening 84a to the first straight line L1 is shorter than that to the rotation axis C of the motor 28, and a distance from the other of the third valve opening 83a and the fourth valve opening 84a to the first straight line L1 is longer than that to the rotation axis C of the motor 28. With such a configuration, the motor 28, the third valve 35, and the fourth valve 36 can collectively be disposed in a small space. Thus, the base body 51 can be downsized.

Preferably, in the hydraulic pressure control unit 50, in the state where the surface (the primary surface 51a) on which the motor 28 of the base body 51 is vertically provided is seen from the front, the first straight line L1 is located between the motor 28 and the portion of the surface (the primary surface 51a) that intersects with a surface (the second side surface 51c) in which the accumulator 33 is embedded. With such a configuration, the accumulator 33 can be disposed near the second valve 32. Thus, the base body 51 can be downsized while the internal channels of the base body 51 are inhibited from becoming complicated.

Preferably, in the hydraulic pressure control unit 50, in the state where the surface (the primary surface 51a) on which the motor 28 of the base body 51 is vertically provided is seen from the front, the fifth valve opening 85a of the base body 51 and the sixth valve opening 86a of the base body 51 overlap the first straight line L1. The fifth valve 41 (the EV in the front-wheel hydraulic circuit 14) is inserted in the fifth valve opening 85a, and the sixth valve 42 (the AV in the front-wheel hydraulic circuit 14) is inserted in the sixth valve opening 86a. With such a configuration, fabrication of the internal channels of the base body 51 can be simplified in such a configuration that the base body 51 is shared by the multiple hydraulic circuits (the rear-wheel hydraulic circuit 12 and the front-wheel hydraulic circuit 14).

In particular, in the state where the surface (the primary surface 51a) on which the motor 28 of the base body 51 is vertically provided is seen from the front, the seventh valve opening 87a of the base body 51 and the eighth valve opening 88a of the base body 51 preferably overlap the third straight line L3 that passes the outer side of the motor 28 and the far side of the rotation axis C of the motor 28 with the second straight line L2 being the reference and that crosses the first straight line L1 at the right angle. The seventh valve 45 (the USV in the front-wheel hydraulic circuit 14) is inserted in the seventh valve opening 87a, and the eighth valve 46 (the HSV in the front-wheel hydraulic circuit 14) is inserted in the eighth valve opening 88a. With such a configuration, the base body 51 can be downsized while the fabrication of the internal channels of the base body 51 is simplified in such a configuration that the base body 51 is shared by the plural hydraulic circuits (the rear-wheel hydraulic circuit 12 and the front-wheel hydraulic circuit 14).

In particular, in the state where the surface (the primary surface 51a) on which the motor 28 of the base body 51 is vertically provided is seen from the front, the first valve opening 81a and the second valve opening 82a are preferably located on the side where the second straight line L2 is present with the reference straight line LC being the reference, and the fifth valve opening 85a and the sixth valve opening 86a are preferably located on a side where the second straight line L2 is absent with the reference straight line LC being the reference. The reference straight line LC crosses the first straight line L1 at the right angle and passes the rotation axis C of the motor 28. With such a configuration, the fabrication of the internal channels of the base body 51 can reliably be simplified in such a configuration that the base body 51 is shared by the multiple hydraulic circuits (the rear-wheel hydraulic circuit 12 and the front-wheel hydraulic circuit 14).

Preferably, the steps 71a, each of which displaces the inner circumferential surface of the motor hole 71 in the direction away from the outer circumferential surface of the motor 28, are formed on the inner circumferential surface of the motor hole 71, and in the state where the surface (the primary surface 51a) on which the motor 28 of the base body 51 is vertically provided is seen from the front, the center of at least one of the plural steps 71a is located between the rotation axis C of the motor 28 and the combination of the third valve opening 83a and the fourth valve opening 84a. With such a configuration, the steps 71a, each of which is used to fix the motor 28 to the base body 51, can be formed while size of the base body 51 is inhibited from being increased.

In particular, the plural steps 71a are preferably arranged at the 90° pitch with the rotation axis C of the motor 28 being a reference. With such a configuration, the size of the base body 51 can be inhibited from being increased while the motor 28 is reliably fixed to the base body 51.

Modified Example

Figure 7:
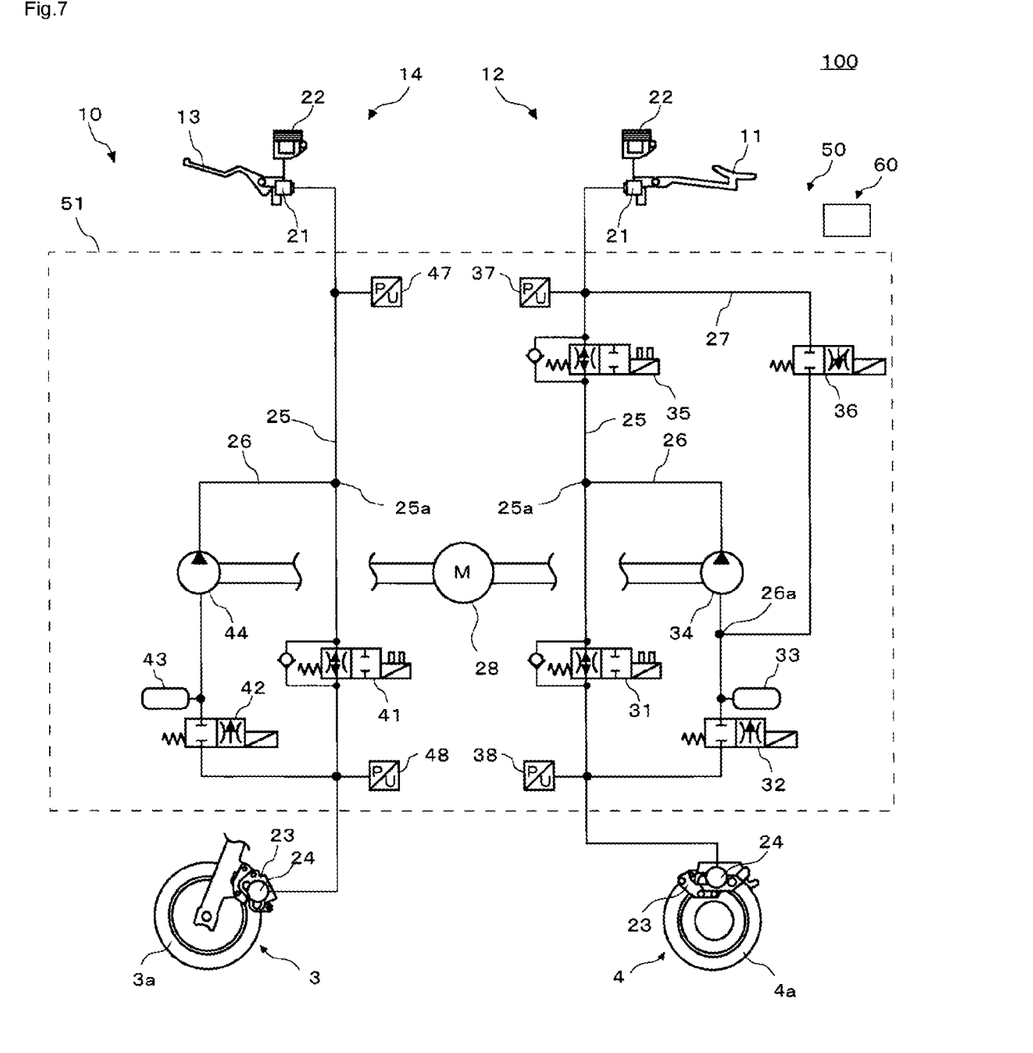
FIG. 7 is a configuration diagram of a modified example of the straddle-type vehicle brake system according to the embodiment of the present invention.

FIG. 7 is a configuration diagram of a modified example of the straddle-type vehicle brake system according to the embodiment of the present invention.

The case where each of the rear-wheel hydraulic circuit 12 and the front-wheel hydraulic circuit 14 includes the supply channel 27 has been described so far. However, as depicted in FIG. 7, only the rear-wheel hydraulic circuit 12 may include the supply channel 27. In such a case, the rear-wheel hydraulic circuit 12 corresponds to the "first hydraulic circuit" in the present invention. Alternatively, only the front-wheel hydraulic circuit 14 may include the supply channel 27. In such a case, the front-wheel hydraulic circuit 14 corresponds to the "first hydraulic circuit" in the present invention.

Figure 8:
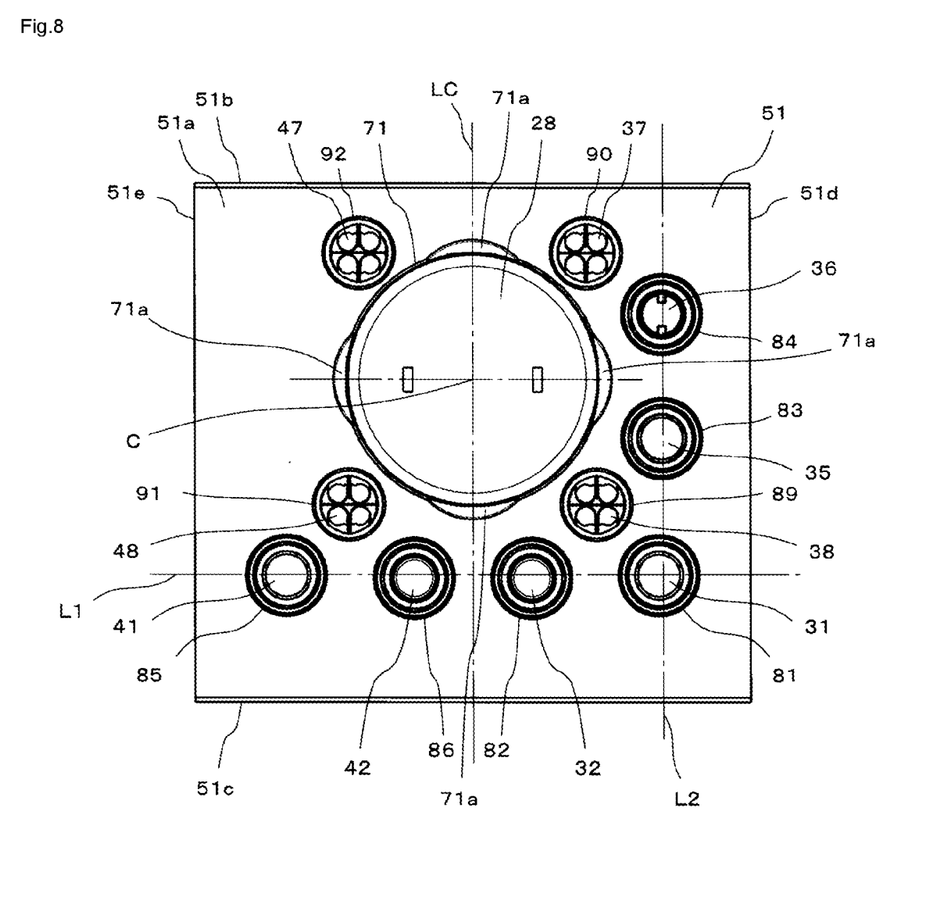
FIG. 8 is a plan view of a state where each member is attached to a base body of a hydraulic pressure control unit in the modified example of the straddle-type vehicle brake system according to the embodiment of the present invention.

FIG. 8 is a plan view of a state where each member is attached to a base body of a hydraulic pressure control unit in the modified example of the straddle-type vehicle brake system according to the embodiment of the present invention.

In the case where only the rear-wheel hydraulic circuit 12 includes the supply channel 27, as depicted in FIG. 8, the members other than those (the seventh valve 45, the eighth valve 46, the seventh valve opening 87a, the eighth valve opening 88a, and the like) related to the supply channel 27 in the front-wheel hydraulic circuit 14 may be disposed in a similar manner to those in the state depicted in FIG. 5. Alternatively, in the case where only the front-wheel hydraulic circuit 14 includes the supply channel 27, the members other than those (the third valve 35, the fourth valve 36, the third valve opening 83a, the fourth valve opening 84a, and the like) related to the supply channel 27 in the rear-wheel hydraulic circuit 12 may be disposed in a similar manner to those in the state depicted in FIG. 5. With such a configuration, similar effects to the above-described effects are exerted. In addition, because a manufacturing process and the like can be shared between the case where each of the rear-wheel hydraulic circuit 12 and the front-wheel hydraulic circuit 14 includes the supply channel 27 and the case where one of the rear-wheel hydraulic circuit 12 and the front-wheel hydraulic circuit 14 includes the supply channel 27, component cost and the like are reduced.

The description has been made so far on the embodiment. However, the present invention is not limited to the description of the embodiment. For example, the embodiment may only partially be implemented.

REFERENCE SIGNS LIST

1: Trunk
2: Handlebar
3: Front wheel
3a: Rotor
4: Rear wheel
4a: Rotor
10: Straddle-type vehicle brake system
11: First brake operation section
12: Rear-wheel hydraulic circuit
13: Second brake operation section
14: Front-wheel hydraulic circuit
21: Master cylinder
22: Reservoir
23: Brake caliper
24: Wheel cylinder
25: Primary channel
25a: Primary channel intermediate portion
26: Secondary channel
26a: Secondary channel intermediate portion
27: Supply channel
28: Motor
28a: Output shaft
28b: Flange
28c: Eccentric body
31, 32, 35, 36, 41, 42, 45, 46: Valve
33, 43: Accumulator
34, 44: Pump
37, 47: Master cylinder hydraulic pressure sensor
38, 48: Wheel cylinder hydraulic pressure sensor
50: Hydraulic pressure control unit
51: Base body
51A: Rear-wheel internal channel
51B: Front-wheel internal channel 51a: Primary surface
51b, 51c, 51d, 51e: Side surface
51f: Back surface
60: Controller
71: Motor hole
71a: Step
71b: Seat
72: Master cylinder port
73: Wheel cylinder port
74: Accumulator hole
75: Pump hole
81 to 88: Valve hole
81a to 88a: Valve opening
89 to 92: Hydraulic pressure sensor hole
89a to 92a: Hydraulic pressure sensor opening
100: Straddle-type vehicle
C: Rotation axis of motor
L1: First straight line
L2: Second straight line
L3: Third straight line
LC: Reference straight line

What is claimed is:

1. A hydraulic pressure control unit (50) configured for use with a straddle-type vehicle brake system (10) having a hydraulic circuit (12) that at least includes: a primary channel (25) through which brake fluid in a master cylinder (21) is delivered to a wheel cylinder (24); a secondary channel (26) which is provided with a pump (34) and through which the brake fluid in the wheel cylinder (24) is released to a primary channel intermediate portion (25a) as an intermediate portion of the primary channel (25) by driving said pump (34); and a supply channel (27) that supplies the brake fluid to a secondary channel intermediate portion (26a) as a region on a suction side of the pump (34) in the secondary channel (26), and controls a hydraulic pressure of the brake fluid in the wheel cylinder (24), the hydraulic pressure control unit (50) comprising:
   a base body (51) that is formed with a first surface (51a) and an internal channel (51A) constituting a part of the hydraulic circuit (12);
   a first valve (31) that is attached to a first valve hole (81) and controls a flow rate in a region on the wheel cylinder (24) side of the primary channel intermediate portion (25a) in the primary channel (25) of the hydraulic circuit (12), the first valve hole (81) extending from a first valve opening (81a) to the internal channel (51A), the first valve opening (81a) being formed in the first surface (51a);
   a second valve (32) that is attached to a second valve hole (82) and controls a flow rate in a region on an upstream side of the secondary channel intermediate portion (26a) in the secondary channel (26) of the hydraulic circuit (12), the second valve hole (82) extending from a second valve opening (82a) to the internal channel (51A), the second valve opening (82a) being formed in the first surface (51a);
   a third valve (35) that is attached to a third valve hole (83) and controls a flow rate in a region on the master cylinder (21) side of the primary channel intermediate portion (25a) in the primary channel (25) of the hydraulic circuit (12), the third valve hole (83) extending from a third valve opening (83a) to the internal channel (51A), the third valve opening (83a) being formed in the first surface (51a);
   a fourth valve (36) that is attached to a fourth valve hole (84) and controls a flow rate in the supply channel (27) of the hydraulic circuit (12), the fourth valve hole (84) extending from a fourth valve opening (84a) to the internal channel (51A), the fourth valve opening (84a) being formed in the first surface (51a); and
   a motor (28) that is a drive source of the pump (34) in the hydraulic circuit (12) and is provided in the base body (51), wherein
   in a state where the first surface (51a) is seen from the front,
   the first valve opening (81a) and the second valve opening (82a) overlap along a first straight line (L1) that passes through the first and second valve openings (81a, 82a) and that passes an outer side of the motor (28),
   the third valve opening (83a) and the fourth valve opening (84a) overlap along a second straight line (L2) that passes through the third and fourth valve openings (83a, 84a), that passes the outer side of the motor (28), and that crosses the first straight line (L1) at a right angle,
   the third valve opening (83a) is positioned between the fourth valve opening (84a) and the first straight line (L1), and
   the motor (28) is inserted in a motor hole (71) that is formed on the first surface (51a) of the base body (51).

2. The hydraulic pressure control unit according to claim 1, wherein
   the hydraulic circuit (12) includes a wheel cylinder hydraulic pressure sensor (38) that is attached to a first hydraulic pressure sensor hole (89) and detects the hydraulic pressure of the brake fluid in the wheel cylinder (24), the first hydraulic pressure sensor hole (89) extending from a first hydraulic pressure sensor opening (89a) to the internal channel (51A) the first hydraulic pressure sensor opening (89a) being formed in the first surface (51a), and
   in the state where the first surface (51a) is seen from the front,
   the first hydraulic pressure sensor opening (89a) is located between the motor (28) and a combination of the first straight line (L1) and the second straight line (L2).

3. The hydraulic pressure control unit according to claim 2, wherein
   the hydraulic circuit (12) includes a master cylinder hydraulic pressure sensor (37) that is attached to a second hydraulic pressure sensor hole (90) and detects a hydraulic pressure of the brake fluid in the master cylinder (21), the second hydraulic pressure sensor hole (90) extending from a second hydraulic pressure sensor opening (90a) to the internal channel (51A), the second hydraulic pressure sensor opening (90a) being formed in the first surface (51a), and
   in the state where the first surface (51a) is seen from the front,
   the second hydraulic pressure sensor opening (90a) is located on a far side of the third valve opening (83a) and the fourth valve opening (84a) with the first straight line (L1) being a reference.

4. The hydraulic pressure control unit according to claim 1, wherein
   in the state where the first surface (51a) is seen from the front,
   a distance from one of the third valve opening (83a) and the fourth valve opening (84a) to the first straight line (L1) is shorter than that to the rotation axis (C) of the motor (28), and a distance from the other of the third valve opening (83a) and the fourth valve opening (84a) to the first straight line (L1) is longer than that to the rotation axis (C) of the motor (28).

5. The hydraulic pressure control unit according to claim 1, wherein
an accumulator (33) that stores the brake fluid is provided in a region between the second valve (32) and a suction side of the pump (34) in the secondary channel (26) of the hydraulic circuit (12),
the accumulator (33) is embedded in an intersecting surface (51c) that intersects with the first surface (51a) of the base body (51), and
in the state where the first surface (51a) is seen from the front,
the first straight line (L1) is located between the motor (28) and a portion of the first surface (51a) that intersects with the intersecting surface (51c).

6. The hydraulic pressure control unit according to claim 1, wherein
in addition to a first hydraulic circuit (12) as the hydraulic circuit, the straddle-type vehicle brake system (10) has a second hydraulic circuit (14) that at least includes a primary channel (25) and a secondary channel (26),
in addition to a first internal channel (51A) as the internal channel, the base body (51) is formed with a second internal channel (51B) that constitutes a part of the second hydraulic circuit (14), and
the hydraulic pressure control unit (50) includes:
a fifth valve (41) that is attached to a fifth valve hole (85) and controls a flow rate in a region on the wheel cylinder (24) side of a primary channel intermediate portion (25a) in the primary channel (25) of the second hydraulic circuit (14), the fifth valve hole (85) extending from a fifth valve opening (85a) to the second internal channel (51B), the fifth valve opening (85a) being formed in the first surface (51a); and
a sixth valve (42) that is attached to a sixth valve hole (86) and controls a flow rate in a region on a suction side of a pump (44) in the secondary channel (26) of the second hydraulic circuit (14), the sixth valve hole (86) extending from a sixth valve opening (86a) to the second internal channel (51B), the sixth valve opening (86a) being formed in the first surface (51a),
the motor (28) is the drive source of the pump (34) in the first hydraulic circuit (12) and the pump (44) in the second hydraulic circuit (14), and
in the state where the first surface (51a) is seen from the front,
the fifth valve opening (85a) and the sixth valve opening (86a) overlap the first straight line (L1).

7. The hydraulic pressure control unit according to claim 6, wherein
the second hydraulic circuit (14) further includes the supply channel (27),
the hydraulic pressure control unit (50) further includes:
a seventh valve (45) that is attached to a seventh valve hole (87) and controls a flow rate in a region on the master cylinder (21) side of the primary channel intermediate portion (25a) in the primary channel 25 of the second hydraulic circuit (14), the seventh valve hole (87) extending from a seventh valve opening (87a) to the second internal channel (51B), the seventh valve opening (87a) being formed in the first surface (51a); and
an eighth valve (46) that is attached to an eighth valve hole (88) and controls a flow rate in the supply channel (27) of the second hydraulic circuit (14), the eighth valve hole (88) extending from an eighth valve opening (88a) to the second internal channel (51B), the eighth valve opening (88a) being formed in the first surface (51a),
the sixth valve (42) controls the flow rate in a region on the upstream side of a secondary channel intermediate portion (26a) in the secondary channel (26) of the second hydraulic circuit (14), and
in the state where the first surface (51a) is seen from the front,
the seventh valve opening (87a) and the eighth valve opening (88a) overlap a third straight line (L3) that passes the outer side of the motor (28) and a far side of the rotation axis © of the motor (28) with the second straight line L2 being a reference and that crosses the first straight line (L1) at the right angle.

8. The hydraulic pressure control unit according to claim 6, wherein
in the state where the first surface (51a) is seen from the front,
the first valve opening (81a) and the second valve opening (82a) are located on a side where the second straight line (L2) is present with a reference straight line (LC) being a reference, the reference straight line (LC) crossing the first straight line (L1) at the right angle and passing the rotation axis (C) of the motor (28), and
the fifth valve opening (85a) and the sixth valve opening (86a) are located on a side where the second straight line (L2) is absent with the reference straight line (LC) being the reference.

9. The hydraulic pressure control unit according to claim 1, wherein
the motor hole (71) is vertically provided,
plural steps (71a), each of which displaces an inner circumferential surface of the motor hole (71) in a direction away from an outer circumferential surface of the motor (28), are formed on said inner circumferential surface, and
in the state where the first surface (51a) is seen from the front,
a center of at least one of the plural steps (71a) is located between the rotation axis (C) of the motor (28) and the combination of the third valve opening (83a) and the fourth valve opening (84a).

10. The hydraulic pressure control unit according to claim 9, wherein the plural steps (71a) are arranged at 90° pitch with the rotation axis (C) of the motor (28) being a reference.

11. A straddle-type vehicle brake system comprising:
the hydraulic pressure control unit (50) according to claim 1.

* * * * *